United States Patent
Jagannatha et al.

(10) Patent No.: US 10,585,757 B1
(45) Date of Patent: Mar. 10, 2020

(54) AUTHORIZATION-BASED FILE EXCLUSION TECHNIQUE FOR BLOCK-BASED STORAGE

(71) Applicant: EMC IP Holding Company LLC, Hopkinton, MA (US)

(72) Inventors: Manjunath Jagannatha, Bangalore (IN); Kiran M V Kumar, Bangalore (IN); Ravi Shankar Panem, Bangalore (IN)

(73) Assignee: EMC IP Holdings Company LLC, Hopkinton, MA (US)

( * ) Notice: Subject to any disclaimer, the term of this patent is extended or adjusted under 35 U.S.C. 154(b) by 512 days.

(21) Appl. No.: 15/282,847

(22) Filed: Sep. 30, 2016

(51) Int. Cl.
*G06F 16/30* (2019.01)
*G06F 11/14* (2006.01)
*G06F 16/16* (2019.01)
*G06F 16/188* (2019.01)

(52) U.S. Cl.
CPC ........ *G06F 11/1451* (2013.01); *G06F 16/162* (2019.01); *G06F 16/188* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 8,060,476 B1* | 11/2011 | Afonso | G06F 11/1451 707/649 |
| 9,195,670 B1* | 11/2015 | Mam | G06F 11/1451 |
| 9,235,582 B1* | 1/2016 | Madiraju Varadaraju | G06F 17/30088 |
| 9,563,640 B2* | 2/2017 | Sudhakar | G06F 17/3023 |
| 2010/0011178 A1* | 1/2010 | Feathergill | G06F 11/1466 711/162 |
| 2016/0232060 A1* | 8/2016 | Nanivadekar | G06F 17/30117 |
| 2017/0329543 A1* | 11/2017 | Slater | G06F 12/16 |

* cited by examiner

*Primary Examiner* — Tarek Chbouki
(74) *Attorney, Agent, or Firm* — Womble Bond Dickinson (US) LLP

(57) ABSTRACT

One embodiment is related to a method for excluding files from a backup image file during a backup operation, comprising: determining files to be excluded from the backup image; taking a first snapshot of a source volume; exposing an iSCSI (Internet Small Computer System Interface) disk with the first snapshot being a target; deleting files to be excluded from the exposed iSCSI disk; taking a second snapshot of the exposed iSCSI disk; and streaming the second snapshot of the exposed iSCSI disk to create a save set in a virtual disk file on a backup medium.

18 Claims, 7 Drawing Sheets

US 10,585,757 B1

AUTHORIZATION-BASED FILE EXCLUSION TECHNIQUE FOR BLOCK-BASED STORAGE

FIELD OF THE INVENTION

The disclosure relates generally to a data backup method, apparatus, and system, and more particularly to excluding files from a backup.

BACKGROUND

In general backup users conFigure save sets in a management interface by specifying the volume to be backed up (e.g., "C:\", or "/user", etc.). In normal scenarios the entire save set (e.g., a volume) would be backed up. However, sometimes backing up the entire save set may not be desirable if the save set contains some trivial data. Vendors typically provide solutions to exclude the trivial data from the backup image file. For example, the user may be able to exclude unnecessary files (e.g., .jpeg image files, or .inf setup information files, etc.) from the backup image file of a volume. The technique and functionality of excluding or removing files from a backup image file may be referred to as exclude list. Generally, three categories of files may be excluded with an exclude list: 1) files belonging to a specific VSS (Volume Shadow Copy Service) writer (e.g., a Microsoft Exchange server writer or a SQL "Structured Query Language" database server writer, etc.), 2) vendor pre-defined files (e.g., a pagefile such as "pagefile.sys"), and 3) user-specified files.

Conventionally, in a block-based backup system, excluding files may involve snapshotting the volume, determining blocks corresponding to the files to be excluded, and deleting these blocks from the snapshot. However, not all volume managers may provide snapshotting capabilities or capabilities to write to the snapshots. Therefore, different implementations of the exclude list for different platforms may be required. For example, presently the EMC NetWorker Block-Based Backup solution that is available for the Microsoft Windows platform is based on the VSS functionality provided by the Microsoft Windows OS (Operating System). An OS-independent technique for implementing the exclude list may be useful.

BRIEF DESCRIPTION OF THE DRAWINGS

Embodiments of the invention are illustrated by way of example and not limitation in the Figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

One embodiment of the disclosure is related to a method, apparatus, and system for excluding files from a backup image file during a backup operation. Another embodiment of the disclosure is related to a method, apparatus, and system for excluding files at the time a backup image file is recovered (e.g., either when the backup image file is restored to a physical volume or when the backup image file is mounted as a virtual volume). The files excluded at the time of backup image file recovery may be based on the access privilege associated with a user.

Figure 1:
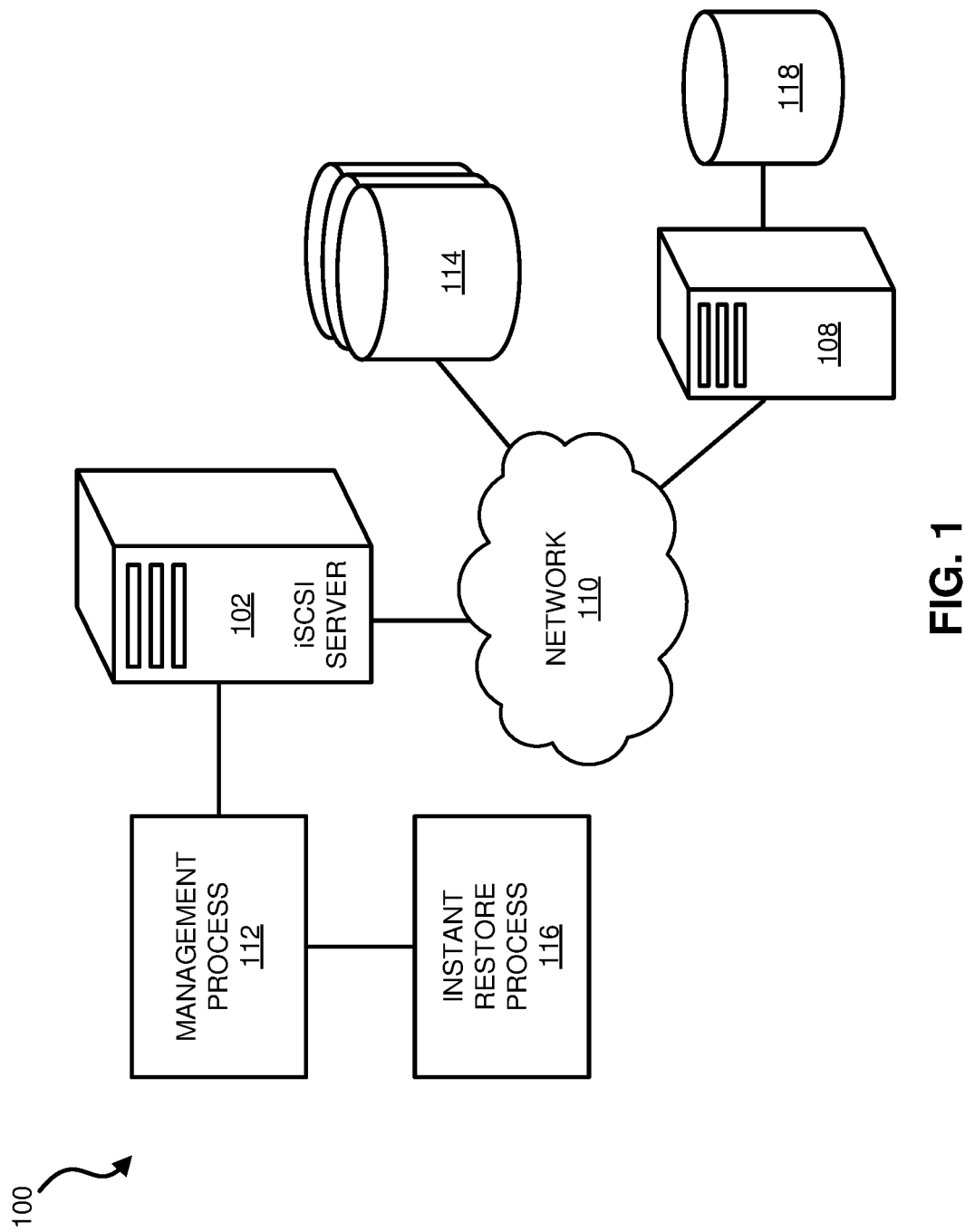
FIG. 1 illustrates a computer network system that implements one or more embodiments of the disclosure.

FIG. 1 illustrates a computer network system 100 that implements one or more embodiments of the disclosure. System 100 comprises one or more data sources, such as computer 108, which may have attached local storage 118 or utilize networked accessed storage devices 114. The data sourced by the data source may be any appropriate data, such as database data that is part of a database management system. A network server computer 102 is coupled directly or indirectly to the data source 108 through network 110, which may be a cloud network, Local Area Network (LAN), Wide Area Network (WAN), or other appropriate network. Network 110 provides connectivity to the various systems, components, and resources of system 100, and may be implemented using protocols such as Transmission Control Protocol (TCP) and/or Internet Protocol (IP), well known in the relevant art. In a distributed network environment, network 110 may represent a cloud-based network environment in which applications, servers and data are maintained and provided through a centralized cloud computing platform.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 110 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices.

For the embodiment of FIG. 1, network system 100 includes a server 102 that executes a data backup/disaster recovery (DR) process with recovery capabilities based on data recover or data restore techniques. The management process 112 automates the backup and/or replication/restore of network data. The instant restore process 116 provides for the ready and instant availability of backup image files without the use of file share protocols to access remote hard disk files, and without changing the original backup image file.

In an embodiment, system 100 represents a backup platform (e.g., EMC NetWorker) that supports block-based backups (BBB) of volumes and files in a virtual hard disk (VHD or VHDx) or a virtual machine disk (VMDK) format. The VHDx format is a container format, which can contain disk related information. VHDx files can be mounted and used as a regular disk with either GUID "Globally Unique Identifier" Partition Table (GPT) or Master Boot Record (MBR) partitions. Volumes such as NTFS (New Technology File System)/ReFS (Resilient File System)/FAT32 (32-bit File Allocation Table) or any file system which the OS supports on the mounted disk can also be created. Differencing VHDx's can be created which will have internal references to parent VHDx. In general, block based backups bypass files and file systems almost completely. The OS file system divides the hard disk, volume or RAID array into groups of bytes called blocks (fixed size) or extents (variable size), which are typically ordered 0-N. The file to be backed up may be in any file format and the format may be the same as or different from the resulting backup image file (e.g., a VHD/VHDx/VMDK file). For example, the file to be backed up may be formatted as a VHD/VHDx/VMDK file, a Microsoft Exchange Database (EDB) file, a Microsoft SQL Server (MDF) file, Oracle database file (DBF), or any other file format.

Figure 2:
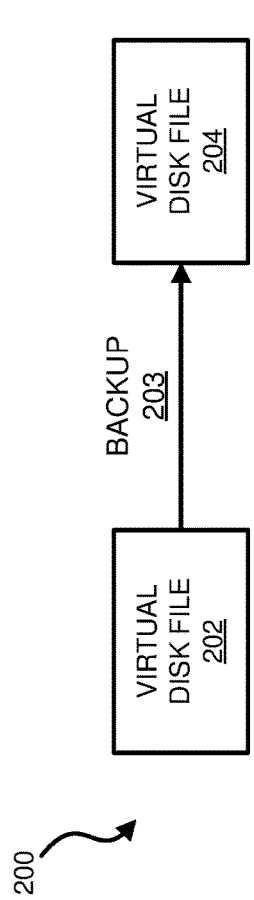
FIG. 2 illustrates an example virtual disk that may be used in a backup operation, in accordance with some embodiments.

FIG. 2 illustrates an example virtual disk 200 that may be used in a backup operation, in accordance with some embodiments. As shown in FIG. 2, a volume may be configured to store information that needs to be backed up through a backup operation 203. For example, the volume may be associated with a database or repository or other data source, and may be referred to as a parent volume. Thus, as shown in FIG. 2, virtual disk file 202 is backed up by operation 203 to virtual disk file 204. File 204 may be configured to store any and all back up information related to the virtual disk file 202. The file 204 may be created based on a virtual disk format and may contain information typically contained in a physical volume.

For some embodiments, the file 204 may be created based on the Hyper-V Virtual Hard Disk (VHDx) format according to the VHDX Format Specification. The file 204 may be referred to as a VHDx file and may be mounted by an operating system that supports VHDx files. One example of such an operating system is the Microsoft Windows OS. The file 204 may be configured to store full backup information of a parent volume (e.g., volume 202). For some embodiments, the backup operation that backs up the parent volume to the file 204 may be performed using a block based backup (BBB) operation. In a block based backup, the information may be read from the parent volume block by block regardless of the number of files stored in the parent volume. The backup operation may take an image of the parent volume without having to refer to the file system associated with the parent volume.

Figure 3:
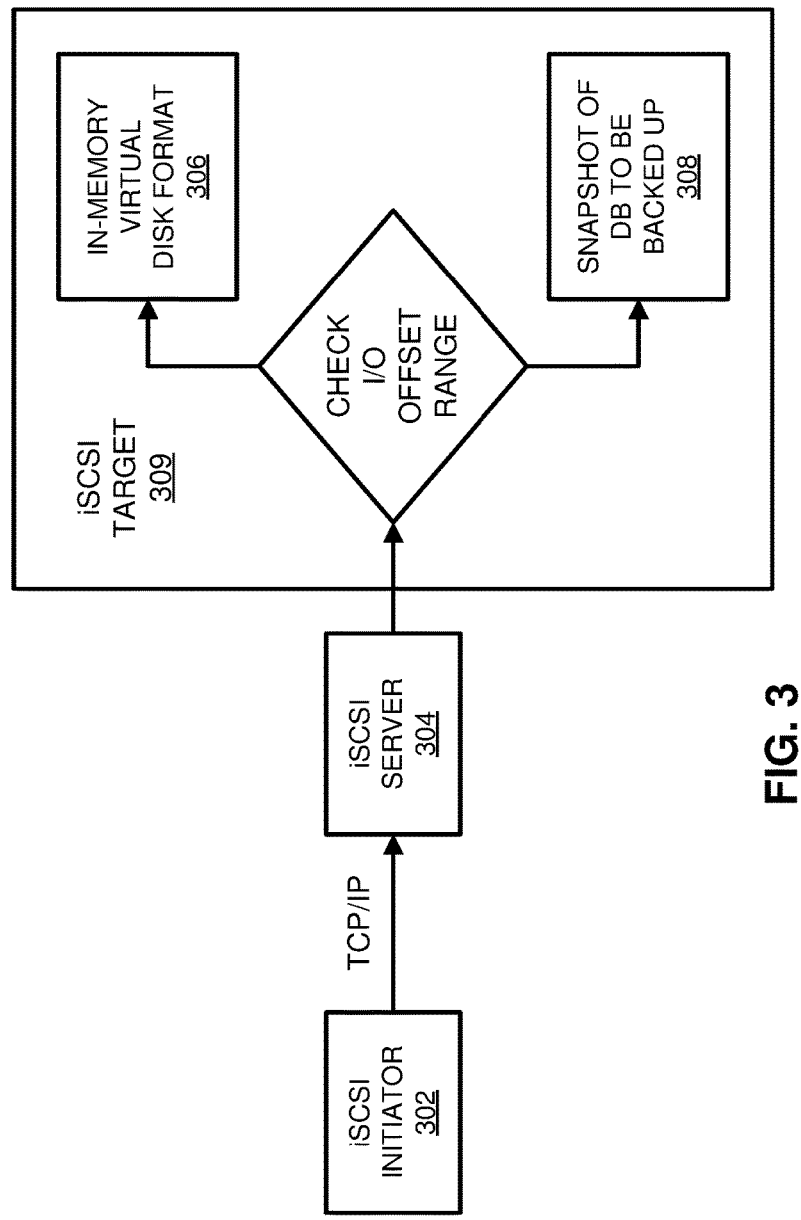
FIG. 3 illustrates an iSCSI network accesses virtual disks over a network.

As shown in FIG. 1, in an embodiment, server 102 is an Inters et Small Computer System interface (iSCSI) server, which uses the iSCSI protocol to serve iSCSI targets represented by virtual disk files that comprise the backups. In this embodiment, an iSCSI initiator provided by the operating system is used to connect to an iSCSI server capable of exposing virtual disks from the backup location. This is shown in FIG. 3, which illustrates an iSCSI network 300 accessing virtual disks over a network. The iSCSI initiator 302 communicates with iSCSI server 304 over a TCP/IP network, which in turn accesses a variety of different virtual disk systems.

In general, the iSCSI allows two hosts to negotiate and then exchange SCSI commands (CDBs) using IP networks. It thus works on top of the Transport Control Protocol (TCP) and allows SCSI commands to be sent end-to-end over LANs, WANs, or the Internet. iSCSI works by transporting block-level data between an iSCSI initiator 302 on a server 304 and an iSCSI target 309 on a storage device. The iSCSI protocol processes the SCSI commands as packetized data for the TCP/IP layer. Received packets are disassembled and the SCSI commands are separated so that the operating system sees the storage as a local SCSI device that can be formatted as usual. The iSCSI protocol can be used to take a high-performance local storage bus and emulate it over a wide range of networks, creating a storage area network (SAN) that does not require any dedicated cabling and can be run over existing IP infrastructure.

In an embodiment, standard SCSI commands, sent in a Command Descriptor Block (CDB), are used to implement aspects of the restore process. The CDBs can be of any appropriate size and format, for example, a CDB can be a total of 6, 10, 12, or 16 bytes, or variable-length. The CDB may consist of a one-byte operation code followed by some command-specific parameters that conform to industry standard available commands.

For data storage applications, such as that shown in FIG. 1, the iSCSI server 102 is configured to access disk volumes on storage arrays that may be part of a SAN. This provides storage consolidation functions, as well as DR functions in which storage resources may be mirrored from one data center to a remote data center, which can serve as a hot standby in the event of a prolonged outage. Through the iSCSI protocol entire disk arrays can be migrated across a network with minimal configuration changes.

For the embodiment of FIG. 3, the initiator 302 functions as an iSCSI client and typically serves the same purpose to a computer as a SCSI bus adapter does by sending SCSI commands over an IP network. An initiator can be either a software initiator that uses program code to implement the iSCSI, such as through a kernel side device driver, or a hardware initiator that uses dedicated hardware to implement iSCSI. An iSCSI host bus adapter (HBA) implements a hardware initiator. An iSCSI target 309 generally refers to a storage resource located on an iSCSI server and represents an instance of iSCSI storage nodes running on that server as a target. In a SAN, an iSCSI target is often a dedicated network-connected hard disk storage device, but may also be a general-purpose computer. For the embodiment of FIG. 2, the iSCSI targets reside in large storage arrays, such as RAID arrays 114. These arrays can be in the form of commodity hardware with or as commercial products such as EMC's VNX, VMAX, or other systems. A storage array usually provides distinct iSCSI targets for numerous clients.

In an embodiment, the restore/recovery process 116 uses the iSCSI protocol to provide granular very operation. This process emulates the backup image files present in the remote machine as if it were present on the local machine in a local volume which is formatted with a known file system. In this embodiment, the iSCSI server 102 exposes iSCSI targets present as a virtual disk in the backup management system. The iSCSI server 102 is configured to mount an iSCSI target comprising a virtual disk, which is run on the computer where granular recovery is desired. The iSCSI initiator component is available as part of the operating system that is used to connect to the iSCSI server 102. The iSCSI server exposes virtual disks (VHD/VHDx/VMDK, or other virtual disk format) as a logical unit number (LUN) to the connecting iSCSI client. In order to achieve this, SCSI reads from the virtual disk are performed using appropriate application program interfaces (APIs). The backup save set may be mounted as a local disk in the machine.

For purposes of description, the term "granular" refers to the granularity or size of the data set (saveset) that is stored and recovered or restored during backup and recovery operations. It generally refers to the level of detail characterizing backup data. For example, data may be stored at a block level, file level, message level, and so on. Backups may also be characterized by type, such as full, incremental, differential, and synthetic.

Exclusion of Files During Backup Operation

Figure 4:
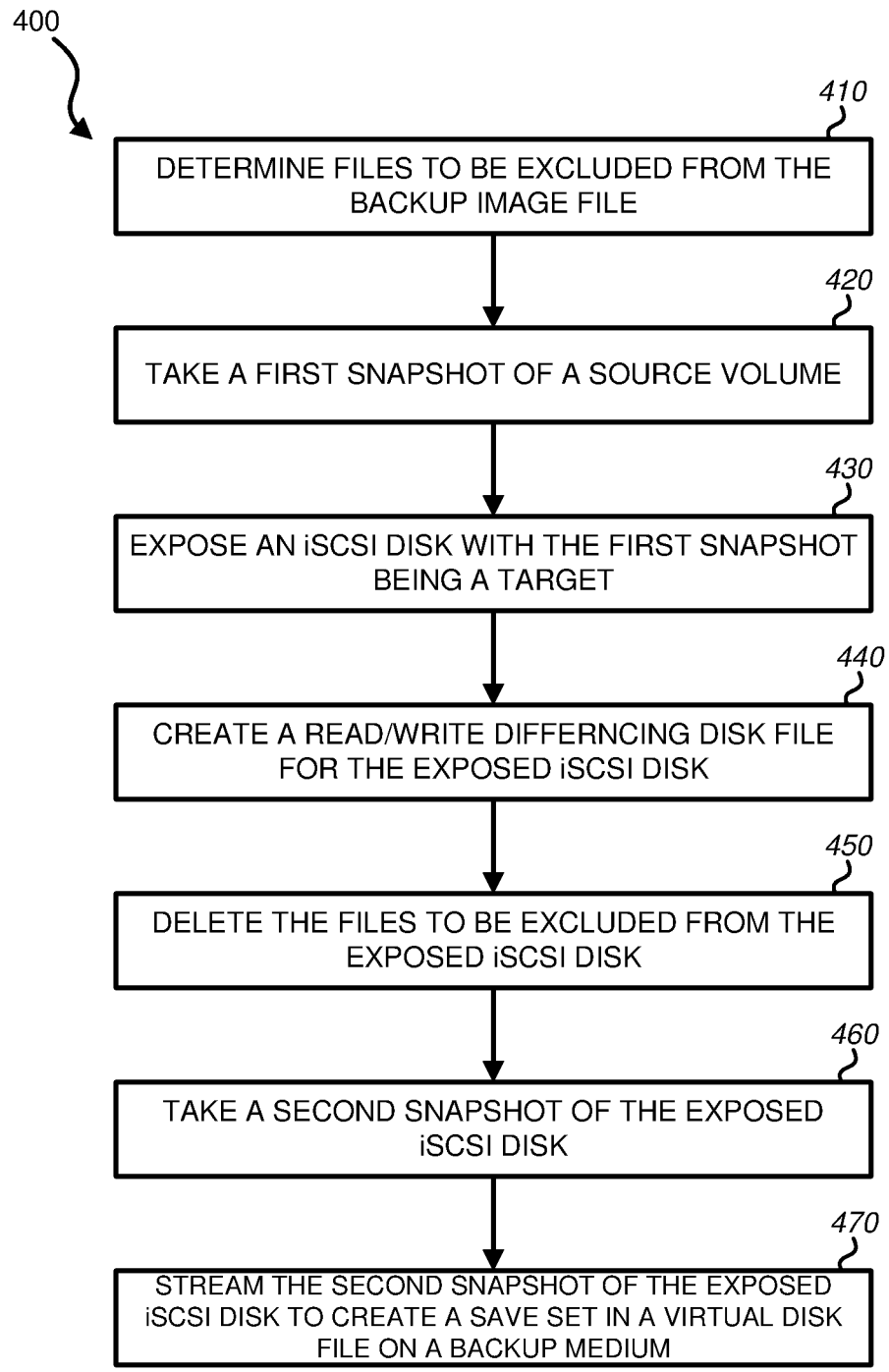
FIG. 4 is a flowchart illustrating an example method for excluding files from a backup image file during a backup operation.

Referring to FIG. 4, a flowchart illustrating an example method 400 for excluding files from a backup image file during a backup operation is shown. At block 410, files to be excluded from the backup image file may be determined. The list of files to be excluded may be based on a predefined configuration, a user input, or a combination thereof. For example, the list of files to be excluded may comprise a list of VSS writer names or GUIDs (corresponding files or components are to be excluded), a user-defined file list, a predefined global exclusion directive specification, or any combination thereof. At block 420, a first snapshot of a source volume may be taken. The first snapshot may be a VSS snapshot and may be contained in a virtual disk file (e.g., a VHD/VHDx/VMDK file). At block 430, an iSCSI disk may be exposed with the first snapshot being a target. At block 440, a read/write differencing disk file may be created for the exposed iSCSI disk. At block 450, the files to be excluded may be deleted from the exposed iSCSI disk. The deletion may be performed using native file system APIs of an OS (e.g., the DeleteFile( ) API of Microsoft Windows OS) and may comprise writing to the differencing disk file. At block 460, a second snapshot of the exposed iSCSI disk may be taken. The second snapshot may be a VSS snapshot. At block 470, the second snapshot of the exposed iSCSI disk may be streamed to create a save set in a virtual disk file (e.g., a VHD/VHDx/VMDK file) on a backup medium. Methods for streaming a snapshot to create a save set are known in the art. For example, U.S. Pat. No. 8,738,870, which is incorporated herein by reference, discloses an example method for streaming a snapshot to create a save set in a virtual disk file format in a backup medium. Thus, the save set stored on the backup medium does not include the files that are excluded.

Figure 5:
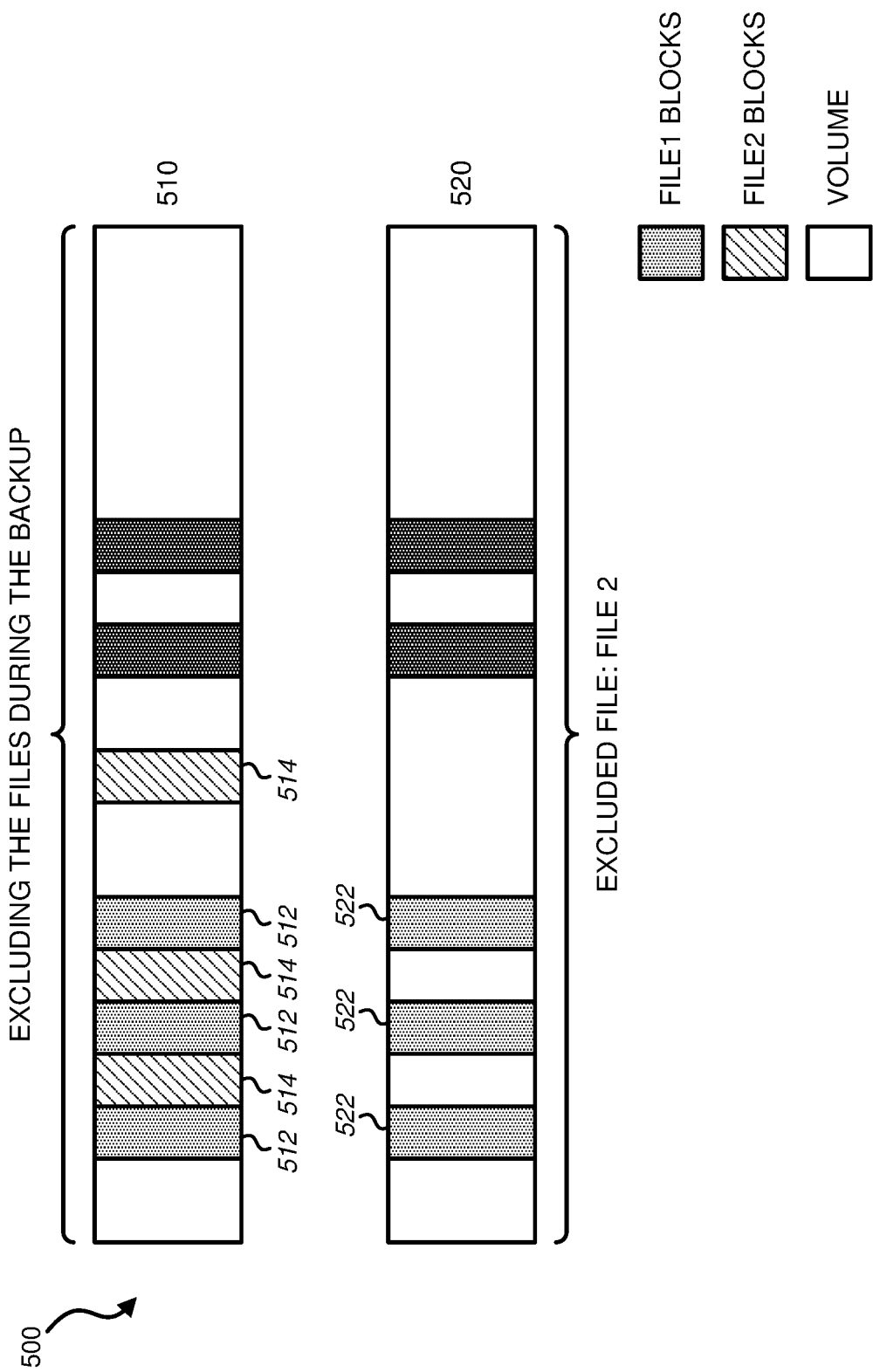
FIG. 5 is a diagram illustrating exclusion of files from a backup image file during a backup operation.

Referring to FIG. 5, a diagram 500 illustrating exclusion of files from a backup image file during a backup operation is shown. The source volume 510 contains blocks 512 for File 1 and blocks 514 for File 2. File 2 is excluded from the backup image file during the backup operation. Thus, the backup image file 520 contains blocks 522 for File 1 but do not contain any blocks for File 2.

Exclusion of Files at the Time of Backup Recovery

Figure 6:
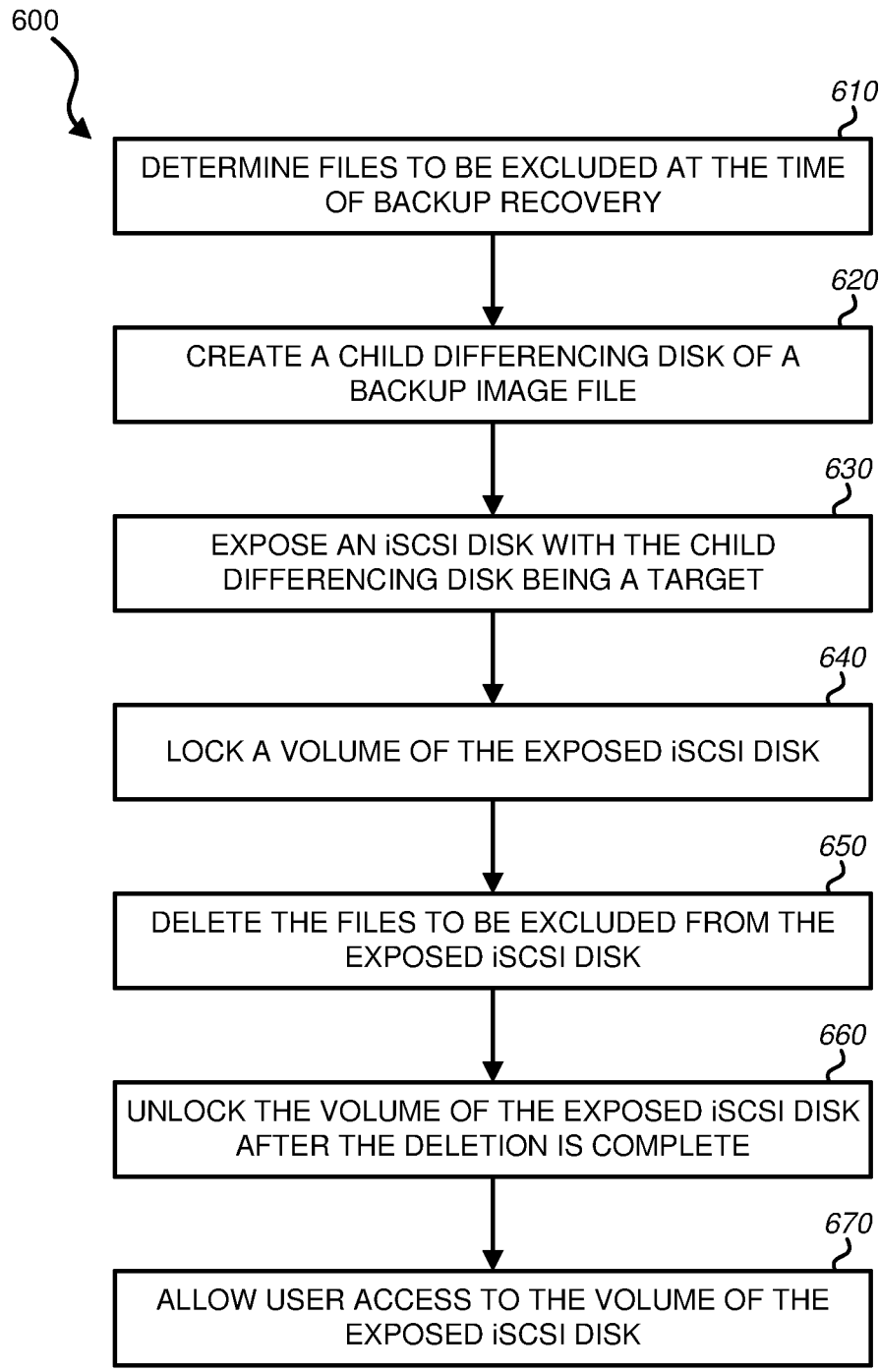
FIG. 6 is a flowchart illustrating an example method for excluding files at a time of backup recovery.

Referring to FIG. 6, a flowchart illustrating an example method 600 for excluding files at a time of backup recovery is shown. At block 610, files to be excluded at the time of backup recovery may be determined. The list of files to be excluded may be based on a predefined configuration, a user input, or a combination thereof. For example, the list of files to be excluded may comprise a list of VSS writer names or GUIDs (corresponding files or components are to be excluded), a user-defined file list, a predefined global exclusion directive specification, or any combination thereof. Further, in one embodiment, the files to be excluded may be based further on access privileges associated with a user. For example, the user may input authentication credentials and certain files may be excluded based on the access privileges associated with the user. Different users may be associated with different access privileges, and thus different files may be excluded for different users.

At block 620, a child differencing disk of a backup image file may be created. At block 630, an iSCSI disk may be exposed with the child differencing disk being a target. At block 640, a volume of the exposed iSCSI disk may be locked to prevent access by other applications. At block 650, the files to be excluded may be deleted from the exposed iSCSI disk. At block 660, the volume of the exposed iSCSI disk may be unlocked after the deletion is complete. At block 670, user access to the volume of the exposed iSCSI disk may be allowed. Therefore, the exposed iSCSI disk that the user may access does not contain the files that are excluded.

Figure 7:
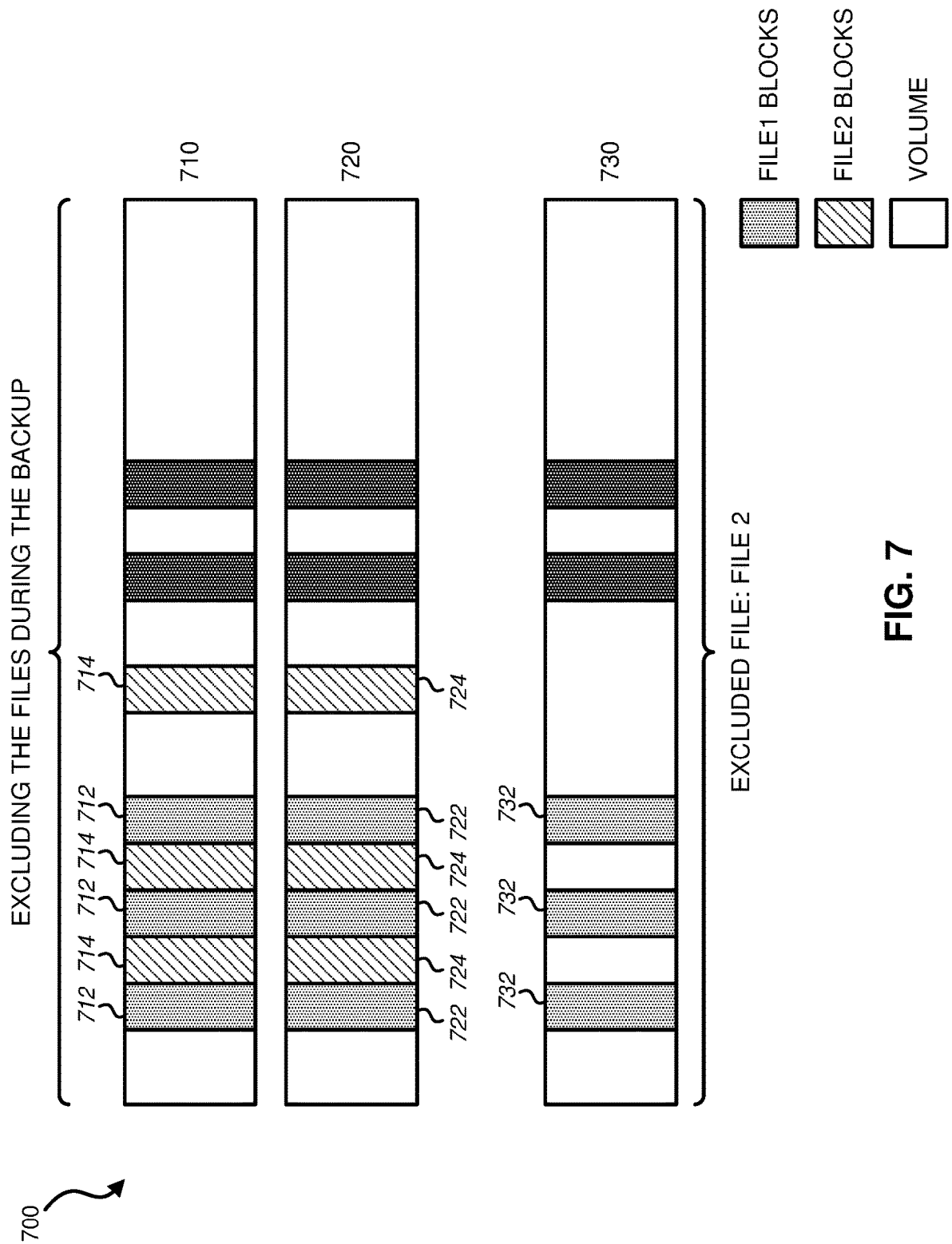
FIG. 7 is a diagram illustrating exclusion of files at the time of backup recovery.

Referring to FIG. 7, a diagram 700 illustrating exclusion of files at the time of backup recovery is shown. The source volume 710 contains blocks 712 for File 1 and blocks 714 for File 2. The backup image 720 contains blocks 722 for File 1 and blocks 724 for File 2. At the time of backup recovery, File 2 is excluded. Therefore, the backup image after file exclusion (e.g., the child image accessible by the user after file exclusion) 730 contains blocks 732 for File 1 but do not contain any blocks for File 2.

Therefore, by utilizing the embodiments described above, files may be excluded, either from the backup image file during the backup operation or at the time of backup recovery, irrespective of the OS platform used or the availability/capability of the volume manager available on the OS platform, as native file system APIs of the OS platform are utilized. Although embodiments have been described in relation to block-based backup techniques, file-based backup techniques may also be used without deviating from the scope of the disclosure as long as the backup data is stored in a mountable format. Moreover, in embodiments where files are excluded at the time of backup recovery, the files that are excluded may be based on user access privileges.

Methods 400, 600 may be performed by processing logic that includes hardware (e.g. circuitry, dedicated logic, etc.), software (e.g., embodied on a non-transitory computer readable medium), or a combination thereof. For example, methods 400, 600 may be performed by processors 1501 of FIG. 8. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

One embodiment of the disclosure is related to a data processing system, comprising: a processor; and a memory coupled to the processor storing instructions which, when executed by the processor, cause the processor to perform backup operations, the operations including determining files to be excluded from the backup image; taking a first snapshot of a source volume; exposing an iSCSI (Internet Small Computer System Interface) disk with the first snapshot being a target; deleting files to be excluded from the exposed iSCSI disk; taking a second snapshot of the exposed iSCSI disk; and streaming the second snapshot of the exposed iSCSI disk to create a save set in a virtual disk file on a backup medium.

Figure 8:
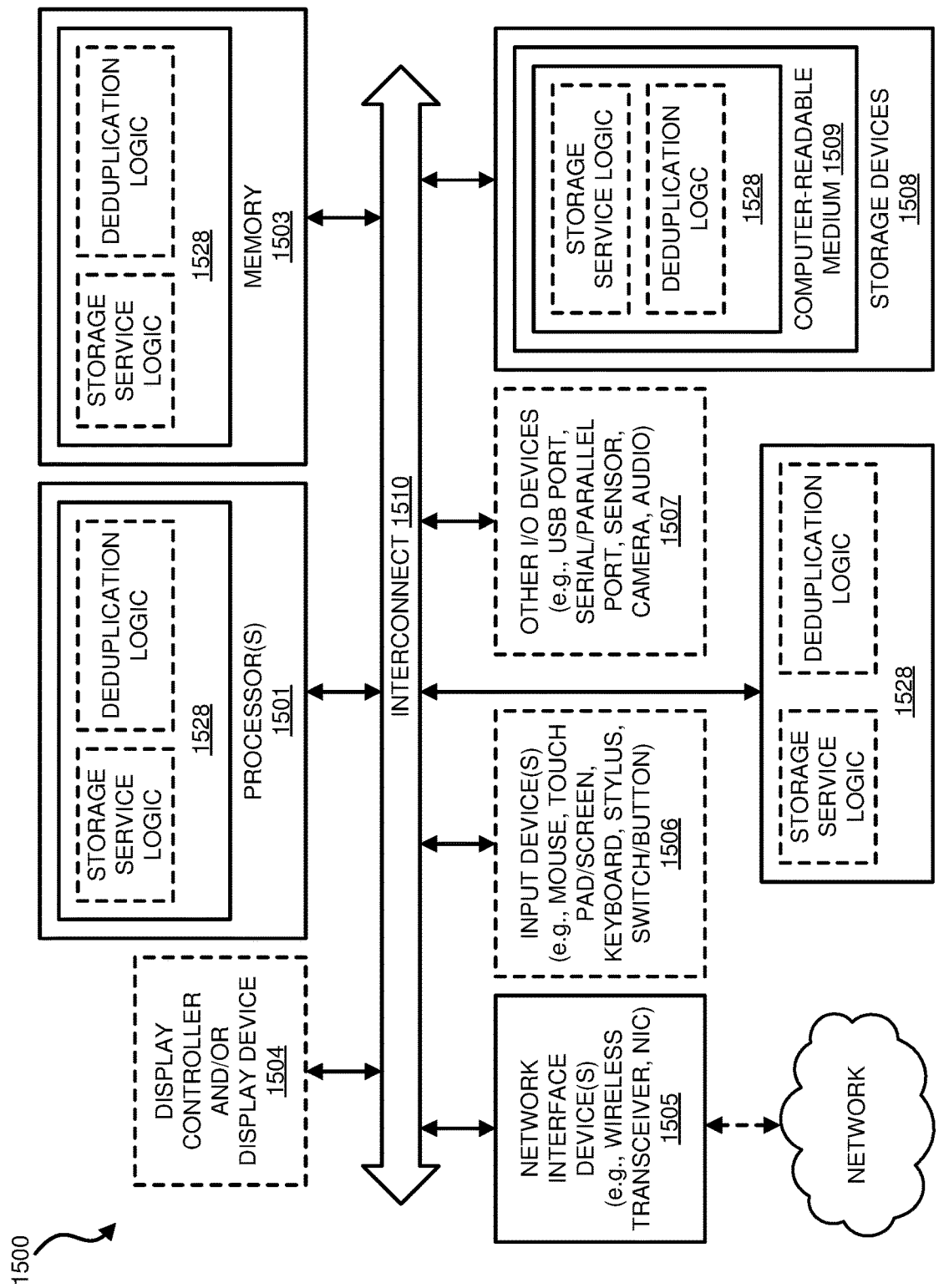
FIG. 8 is a block diagram illustrating an example of a data processing system which may be used with one embodiment of the disclosure.

FIG. 8 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for excluding files from a backup image file during a backup operation, comprising:
   determining files to be excluded from the backup image;
   taking a first snapshot of a source volume;
   exposing an iSCSI (Internet Small Computer System Interface) disk with the first snapshot being an iSCSI target;
   creating a read/write differencing disk for the exposed iSCSI disk;

deleting files to be excluded from the exposed iSCSI disk, wherein the deleting of the files comprises recording the deletion to the differencing disk;

taking a second snapshot of the exposed iSCSI disk; and streaming the second snapshot of the exposed iSCSI disk to create a save set in a virtual disk file on a backup medium.

2. The method of claim 1, wherein a list comprising the files to be excluded comprises a list of VSS (Volume Shadow Copy Service) writer names or GUIDs (Globally Unique Identifiers), a user-defined file list, a predefined exclusion specification, or any combination thereof.

3. The method of claim 1, wherein the first and second snapshots are VSS (Volume Shadow Copy Service) snapshots and are contained in virtual disk files.

4. The method of claim 1, wherein the virtual disk file is mountable.

5. The method of claim 1, wherein the virtual disk file is one of a VHD (Virtual Hard Disk) file, a VHDx file, or a VMDK (Virtual Machine Disk) file.

6. The method of claim 1, wherein the deleting of the files comprises utilizing a native file system API (Application Program Interface) of an OS (Operating System).

7. A non-transitory machine-readable medium having instructions stored therein which, when executed by a processor, cause the processor to perform backup operations, the operations comprising:

determining files to be excluded from the backup image;

taking a first snapshot of a source volume;

exposing an iSCSI (Internet Small Computer System Interface) disk with the first snapshot being an iSCSI target;

creating a read/write differencing disk for the exposed iSCSI disk;

deleting files to be excluded from the exposed iSCSI disk, wherein the deleting of the files comprises recording the deletion to the differencing disk;

taking a second snapshot of the exposed iSCSI disk; and streaming the second snapshot of the exposed iSCSI disk to create a save set in a virtual disk file on a backup medium.

8. The non-transitory machine-readable medium of claim 7, wherein a list comprising the files to be excluded comprises a list of VSS (Volume Shadow Copy Service) writer names or GUIDs (Globally Unique Identifiers), a user-defined file list, a predefined exclusion specification, or any combination thereof.

9. The non-transitory machine-readable medium of claim 7, wherein the first and second snapshots are VSS (Volume Shadow Copy Service) snapshots and are contained in virtual disk files.

10. The non-transitory machine-readable medium of claim 7, wherein the virtual disk file is mountable.

11. The non-transitory machine-readable medium of claim 7, wherein the virtual disk file is one of a VHD (Virtual Hard Disk) file, a VHDx file, or a VMDK (Virtual Machine Disk) file.

12. The non-transitory machine-readable medium of claim 7, wherein the deleting of the files comprises utilizing a native file system API (Application Program Interface) of an OS (Operating System).

13. A data processing system, comprising:

a processor; and a memory coupled to the processor storing instructions which, when executed by the processor, cause the processor to perform backup operations, the operations including determining files to be excluded from the backup image;

taking a first snapshot of a source volume;

exposing an iSCSI (Internet Small Computer System Interface) disk with the first snapshot being an iSCSI target;

creating a read/write differencing disk for the exposed iSCSI disk;

deleting files to be excluded from the exposed iSCSI disk, wherein the deleting of the files comprises recording the deletion to the differencing disk;

taking a second snapshot of the exposed iSCSI disk; and streaming the second snapshot of the exposed iSCSI disk to create a save set in a virtual disk file on a backup medium.

14. The data processing system of claim 13, wherein a list comprising the files to be excluded comprises a list of VSS (Volume Shadow Copy Service) writer names or GUIDs (Globally Unique Identifiers), a user-defined file list, a predefined exclusion specification, or any combination thereof.

15. The data processing system of claim 13, wherein the first and second snapshots are VSS (Volume Shadow Copy Service) snapshots and are contained in virtual disk files.

16. The data processing system of claim 13, wherein the virtual disk file is mountable.

17. The data processing system of claim 13, wherein the virtual disk file is one of a VHD (Virtual Hard Disk) file, a VHDx file, or a VMDK (Virtual Machine Disk) file.

18. The data processing system of claim 13, wherein the deleting of the files comprises utilizing a native file system API (Application Program Interface) of an OS (Operating System).

* * * * *